May 15, 1956  E. ROY  2,745,571
CHUTE MEANS FOR URGING BLANKS INTO A CARRIER
Filed Dec. 4, 1953  2 Sheets-Sheet 1
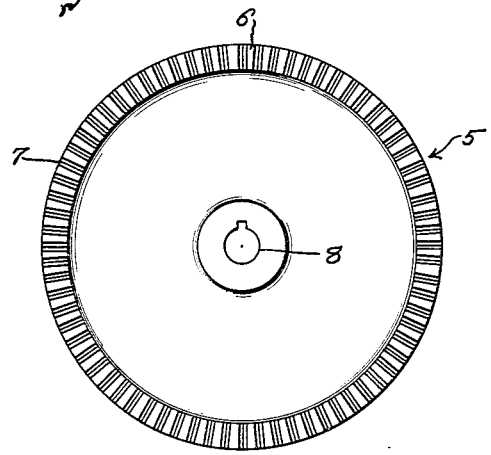
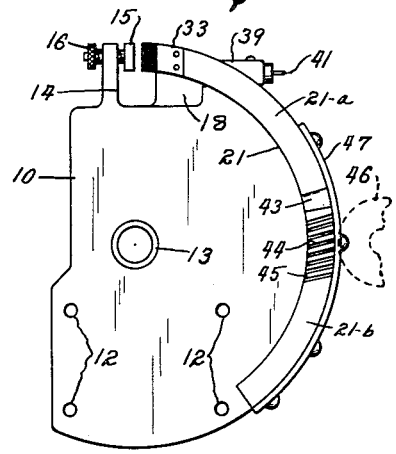
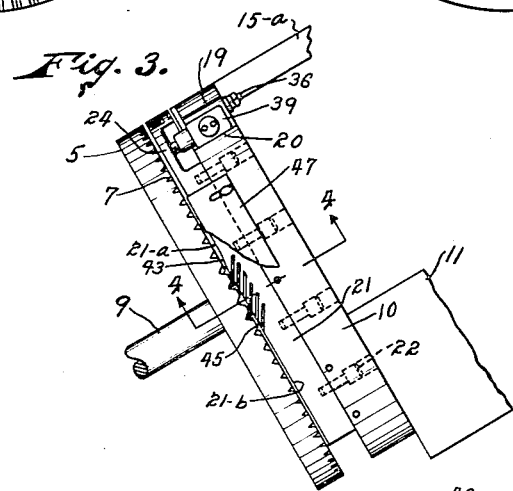
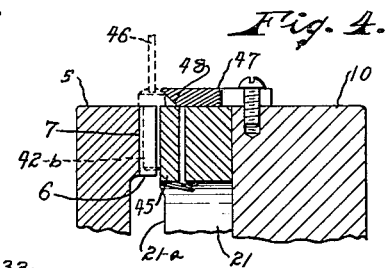
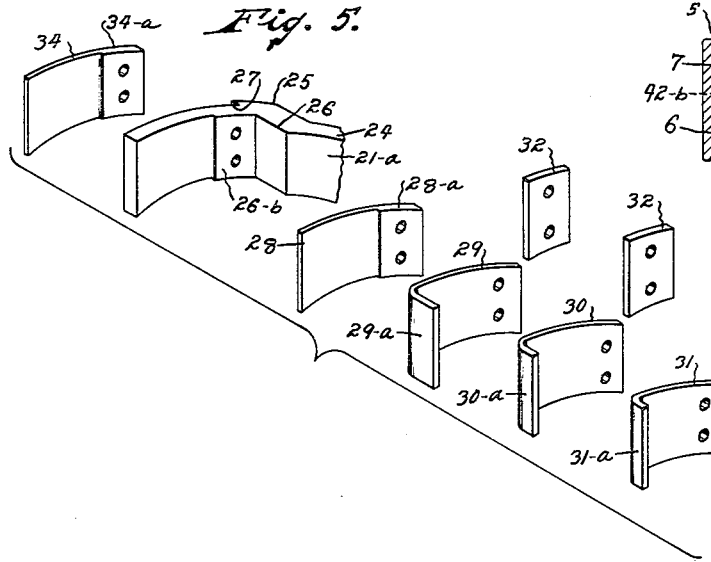
INVENTOR.
EMIL ROY
BY
Louis V. Lucia
ATTORNEY.

May 15, 1956  E. ROY  2,745,571
CHUTE MEANS FOR URGING BLANKS INTO A CARRIER
Filed Dec. 4, 1953  2 Sheets-Sheet 2
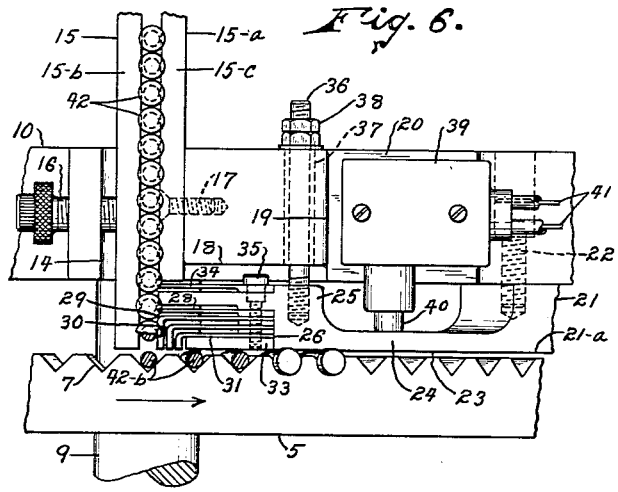
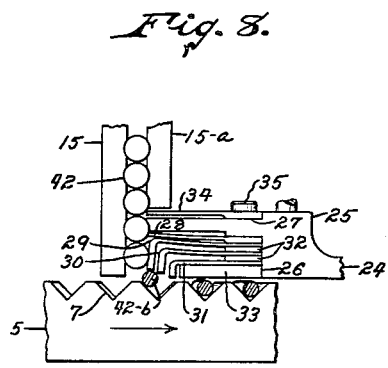
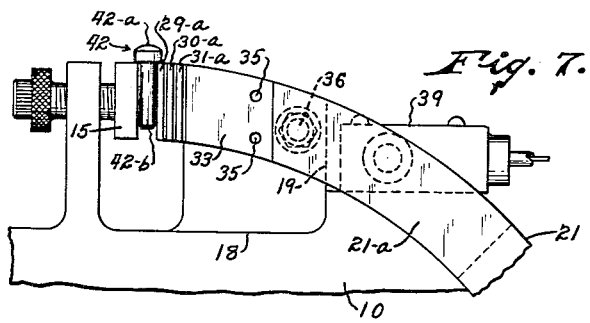
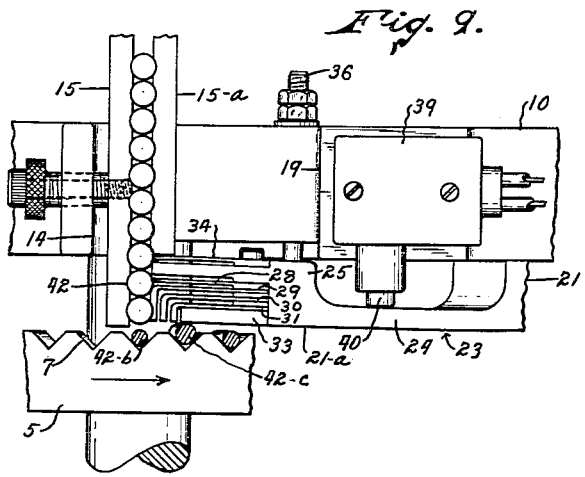
INVENTOR.
EMIL ROY
BY
*Louis V. Lucia*
ATTORNEY.

United States Patent Office 2,745,571
Patented May 15, 1956

2,745,571

CHUTE MEANS FOR URGING BLANKS INTO A CARRIER

Emil Roy, Windsor, Conn.

Application December 4, 1953, Serial No. 396,182

4 Claims. (Cl. 221—243)

This invention relates to a chute means for urging blanks into a carrier and more particularly to improved means in such a machine for eliminating the jamming of the machine by screw blanks which are not properly fed into the carrier member thereof.

The screw slotting machine embodying the instant invention is of the type employing a rotatable carrier wheel having radial notches in the face thereof which receive the shanks of the screw blanks from a track which extends perpendicularly to said face and conveys said blanks to the carrier wheel from a suitable hopper. A stationary retaining plate is disposed adjacent the face of the carrier wheel and is adapted to engage the shanks of the blanks immediately after they are fed into said notches and retain said blanks therein as they are carried in a circular path by the carrier wheel past a circular slotting saw which cuts a screw driver slot in the head of each blank.

In machines of this type heretofore produced, it was found that if the shank of a screw blank did not fully enter its notch in the carrier wheel, said shank was liable to engage the corner of the retaining plate adjacent the end of the track and become jammed between said corner and the approaching face of the notch thereby causing the machine to jam.

This invention provides novel means on the retaining plate of such screw slotting machines which prevents jamming of the carrier wheel by a screw blank which does not fully enter its notch therein; this result being accomplished by the provision of spring means on the corner of said retaining plate which are adapted to yield upon engagement by the shank of a screw blank and then urge said blank into proper position in its notch in the carrier wheel.

This invention further provides a retaining plate having a yieldable section which is adapted to operate switch means for shutting off the machine upon the entry of an oversize blank into one of the notches in the carrier wheel.

Further objects and advantages of this invention will be more clearly understood from the following description and the accompanying drawings in which:

Fig. 1 is an elevational view illustrating the face of the rotatable carrier wheel.

Fig. 2 is a similar view illustrating the retaining plate embodying the instant invention and the supporting plate upon which it is carried.

Fig. 3 is a side view of the carrier wheel and the retaining plate illustrating the relative positions which they occupy when assembled in the machine.

Fig. 4 is a fragmentary sectional end view taken on line 4—4 of Fig. 3.

Fig. 5 is an exploded isometric view illustrating the end of the retaining plate and the springs carried thereby.

Fig. 6 is a top view, on an enlarged scale, of the carrier wheel and the retaining plate in normal operation.

Fig. 7 is a fragmentary elevational view further illustrating the construction of the spring means on the retaining plate.

Fig. 8 is a view similar to Fig. 6, illustrating the operation of the spring means on the retaining plate.

Fig. 9 is a plan view, similar to Fig. 6, illustrating the operation of the retaining plate upon the entry of an oversize blank into one of the notches in the carrier wheel.

Referring now to the drawing, wherein the pertinent parts of the screw slotting machine embodying my invention are illustrated, it will be noted that said machine includes a circular carrier wheel 5 having an annular flange 6 extending from its face in which is formed a plurality of radially disposed, equally spaced, V-shaped notches 7. The carrier wheel has a centrally disposed opening 8 therethrough which receives a shaft 9, to which said carrier wheel is keyed, and said shaft is rotated by suitable driving means (not shown) to cause rotation of the carrier wheel.

A supporting plate 10 is secured to a base member 11 of the machine by means of bolts or the like which extend through holes 12 therein and, when assembled in the machine, said plate and carrier wheel are disposed in parallel relation at an angle of approximately thirty degrees to the vertical, as shown in Fig. 3. The shaft 9 extends through the opening 8 in the carrier wheel and into a suitable bearing 13 in the supporting plate to thereby firmly support said wheel. The upper portion of the supporting plate 10 contains a radial slot 14 which receives elongated flat bars, or track members, 15 and 15-a that extend perpendicularly to the face of the carrier wheel from the hopper (not shown) of the machine and from the conveyor track for the screw blanks. Said track members are disposed with their opposed flat surfaces in spaced relation and their upper edges 15-b and 15-c, respectively, coplanar and flush with the peripheral surface of the carrier wheel. The screw blanks are supported on said upper edges by their heads and the shanks of the blanks hang downwardly between the flat sides of said members. The track member 15 is adjustably supported by adjusting screws, such as shown at 16, which permit its adjustment relatively to the stationary track member 15-a, that is secured to the plate 10 by a screw member 17, to accommodate screw blanks of various sizes. It will be noted, particularly from Fig. 6, that the stationary track member 15-a termintes substantially in the plane of the face of the supporting plate and that the movable track member 15 extends therebeyond and terminates closely adjacent the face of the carrier wheel. A recess 18 is formed in the face of the supporting plate 10 and extends from the slot 14 to the side of a notch 19 in the periphery of the supporting plate which provides a flat supporting surface 20 thereon for a purpose to be hereinafter described.

An arcuate retaining plate 21 is fastened to the surface of the supporting plate 10 by means of cap screws 22 which extend through holes in said supporting plate and is disposed with its retaining surface 21-a spaced from and facing the notches 7 in the carrier wheel; said retaining plate being slightly wider than the flange of said wheel. The retaining plate 21 has, at its upper portion, a resilient section 23 which is spaced from the surface of the supporting plate and includes an arm 24 having a head portion 25 whose flat end surface extends perpendicularly to the retaining surface 21-a and terminates in alignment with the inner flat surface of the stationary track member 15-a, and the peripheral surface of which is flush with the upper edges 15-b and 15-c of the track members. The said head portion contains, at the forward corner thereof, a notch 26 which extends inwardly from the retaining surface, and the surface of the head at the bottom of said notch has a step forming a platform 26-b. The rear surface of the head contains a separate, but shallower, notch 27 thus spacing the rear surface of the head from the end of the stationary track member 15-a as illustrated in Fig. 6.

The notch 26 in the front of the head contains a plurality of spring members, the innermost of which is in the form of a flat leaf spring 28 which is supported on the platform 26-b to space said spring from the bottom of the notch and is provided with an inner end portion 28-a of increased thickness. The free outer end of the spring 28 terminates in alignment with the end of the head and the inner surface of the stationary track member. The remaining spring members contained within the notch 26 are in the form of flat L-shaped springs 29, 30 and 31 of progressively smaller size and each of which has a perpendicularly extending finger 29-a, 30-a and 31-a respectively. Said springs are disposed in nested relation with the free ends of the fingers terminating flush with the surface of the retaining plate and the said fingers are of increased thickness to reduce the space therebetween. The largest spring member 29 is supported against the surface of the thickened portion 28-a of the leaf spring 28 to thereby space said spring members apart, and the side of the perpendicular finger 29-a thereof is disposed in alignment with the inner surface of the stationary track member 15 and the ends of the head 25 and the spring 28. The spring members 30 and 31 are spaced apart by spacers 32—32 and a filler block 33 is secured against the outermost spring 31 with its outer flat surface flush with the surface of the retaining plate.

A flat leaf spring 34, similar to the leaf spring 28, is received in the notch 27 in the rear surface of the head and said spring member has an end portion 34-a of increased thickness, the surface of which rests against the bottom of the notch 27 to space the remainder of the spring therefrom. Said spring extends into the space between said head and the end of the stationary track member 15 and terminates in alignment with its inner surface. The spring members, spacer blocks and the filler block are secured to the head by screws 35—35 which pass through holes therein and are threaded into threaded holes in said filler block. It will be noted that the spring member 34 reduces the width of the space between the head 25 and the end of the track member 15-a and that the spring member 28 reduces the width of the space between the head and the back of the spring member 29 to thereby prevent the shanks of the screw blanks, particularly those of small size, from entering or catching in said spaces and disrupting the flow of blanks from the hopper. Each of the spring members carried on the head is of the same width as the retaining plate and is curved to conform to the curvature of said plate. The upper edges of the spring members 34, 28 and 29 lie in the same plane as the edge of the track member 15-a and thereby provide a supporting surface for the heads of the screw blanks or, in effect, an extension of the track member 15-a.

The screw slotting machine includes means (not shown) for moving the base member 11 that carries the supporting plate 10 to permit adjustment of the retaining plate relatively to the carrier wheel so as to vary the space therebetween to accommodate screw blanks of different sizes. Adjustment of the resilient portion 23 of the retaining plate is also sometimes necessary and for that reason, I have provided a stud 36 that is threaded into the head 25 and extends through a hole 37 in the supporting plate which is substantially larger than the stud and is provided at its end with adjusting nuts 38.

A micro-switch 39 of conventional construction is secured to the flat surface 20 of the notch 19 in the periphery of the supporting plate and is provided with an actuating button 40 which extends into engagement with the rear surface of the resilient arm 24 on the retaining plate. Said switch is connected in the circuit to the motor which drives the machine through electrical conductors 41.

In the normal operation of the machine the screw blanks, indicated at 42, are conveyed from the hopper down the conveyor track in which they are supported by their heads 42-a with the shanks 42-b of the blanks depending between the track members 15 and 15-a and as the screw blanks approach the end of the track, they are supported at one side on the surface of the head 25 and finally upon the edge of the spring 29. The carrier wheel 5 is rotating in a clockwise direction and as each of the notches 7 therein comes into register with the row of screw blanks, the shank of the blank adjacent the face of the wheel is gravitally urged into the said notch and the screw blank is supported therein by its head which extends beyond the edges of the notch and engages the periphery of the carrier wheel. The said blanks are then carried past the ends of the spring fingers at the corner of the head 25 and are moved relatively to the retaining plate 21 whose retaining surface 21-a retains said blanks in their respective notches.

The lower half of the retaining plate 21 is of a greater thickness than the upper portion thereof which brings the surface 21-b of that portion of the retaining plate closer to the face of the flange on the carrier wheel, as illustrated in Fig. 3, to provide a clamping section on said retaining plate. A ramp surface 43 extends upwardly from the normal surface 21-a of the retaining plate to the surface 21-b on the clamping section thereof and a plurality of slots 44 are cut into the clamping section at an angle to the surface of the retaining plate to provide spring fingers 45 having their free ends facing the flange on the carrier wheel. As the screw blanks are carried around in a circular path by the carrier wheel, they are urged tightly into their notches upon engagement of the shanks thereof with the ramp surface and are securely clamped between the faces of the notch and the ends of the spring fingers 45 to prevent rotation of the screw blanks as the heads thereof pass the slotting saw, indicated at 46, which cuts a screw driver slot in said heads. The spring fingers 45, which are fully disclosed in my co-pending application Serial No. 432,819, filed May 27, 1954, and now abandoned, assure positive clamping of each blank since the diameters thereof sometimes vary due to manufacturing tolerances.

After the screw blanks pass beyond the lower end of the retaining plate they drop from the notches in the carrier wheel into a suitable container. Radial movement of the screw blanks in the notches is prevented by a retaining band 47 which is adjustably secured to the periphery of the supporting plate 10 and is provided with a beveled edge 48 which overlies the heads 42-a of the screw blanks.

As above-mentioned, the screw blanks are gravitally moved down the inclined track of the machine from the hopper and into their respective notches in the carrier wheel, and the weight of the screw blanks is usually sufficient to cause entry of the first blank into its respective notch in the proper manner. However, since the carrier wheel rotates at a constant rate, should the first screw blank in the track be delayed or slowed down for any reason, it will not enter its respective notch in the proper position, but will be picked up on the approaching face of the notch as illustrated in Fig. 8. When this occurs, the shank of the screw blank will successively engage the ends of the spring fingers 29-a, 30-a and 31-a as it is carried along by the wheel 5 and cause said fingers to yield so that said shank is allowed to pass by the ends thereof in the manner illustrated in Fig. 8, and the springs will then gradually urge the shank of the screw blank into proper position in its notch before said shank reaches the end of the filler block 33 and jamming of the machine will thereby be prevented. It will be noted from Fig. 8, that if the first spring member 29 is displaced a considerable amount upon engagement by the shank of a screw blank, it will engage and bend the leaf spring 28 therebehind which causes an additional force to be applied to the shank for urging it rapidly into proper position in its notch in the carrier wheel. It will thus be seen that the novel spring means employed on the retaining plate prevents jamming of the machine by a screw blank which does not properly enter the notch in the carrier wheel due to a delay in its movement thereto.

On occasions during the production and handling of screw blanks, blanks of one size have intermixed therewith blanks of a larger size which the track of the screw slotting machine will receive, but the slotting of which it is desired to prevent. Referring now to Fig. 9, it will be seen that if a screw blank, illustrated in an exaggerated manner at 42–c, having a shank diameter substantially greater than that for which the machine is adjusted should enter one of the notches in the carrier wheel, it will be carried thereby past the spring fingers and into engagement with the face of the filler block 33. The oversize blank will urge the head 25 on the retaining plate in a rearward direction and thereby bend the resilient arm 24 of said plate. This will, in turn, cause depression of the actuating button 40 on the microswitch which will operate said switch to shut off the machine before the oversize blank reaches the clamping section on the retaining plate and will, therefore, prevent undue strain on the carrier wheel and possible damage to the machine which would result if the oversize blank were carried into the clamping section. As the resilient section of the retaining arm is deflected by the oversized blank, the spring member 34 will engage the end of the stationary track member 15 and yield thereby permitting movement of the head 25 in a rearward direction. The oversize blank may be removed from the carrier wheel by moving the base member 11 upon which the retaining plate is carried away from the carrier wheel after which the retaining plate may be properly adjusted and the machine again put into operation. It will be noted that the suitable nuts 38 on the stud 36 limit the return of the head 25 on the retaining plate to its adjusted position as illustrated in Fig. 6.

I claim:

1. In a screw slotting machine, a movable carrier member having a plurality of notches in a face thereof adapted to receive the shanks of screw blanks, spaced track members extending perpendicularly to said face for feeding blanks to said carrier member; the end of one of said track members being spaced from said carrier member a greater distance than the other, a retaining plate having a retaining surface adjacent said face of the carrier member adapted to engage the shanks of the screw blanks and retain them in said notches; said retaining plate having a head portion disposed between said end of the track member and the carrier member forming an extension of said track member and a notch extending inwardly thereinto from said retaining surface, a plurality of spring members contained within said notch and having perpendicularly extending fingers thereon disposed in nested relation with their end portions terminating substantially flush with said retaining surface; the side portion of said finger adjacent the end of the head being disposed in alignment with the end of the retaining member to provide an extension of said track member; said spring members being adapted to yield upon engagement by the shanks of screw blanks which do not fully enter said notches and to urge said shanks thereinto.

2. In a screw slotting machine, a movable carrier member having a plurality of notches and a face thereof adapted to receive the shanks of screw blanks, a pair of spaced track members extending perpendicularly to said face for feeding screw blanks to said carrier member; the end of one of said track members being spaced from the said face a greater distance than the other of said track members, a retaining plate having a retaining surface adjacent said face adapted to engage the shanks of said blanks to retain them in said notches and an end portion terminating in the space between the end of said track member and said carrier member and forming an extension of said track member; said end portion of the retaining member having a notch extending thereinto from the retaining surface, resilient means contained within said notch and spaced from the bottom thereof; said resilient means forming an extension of said track member and adapted to yield upon engagement with shanks of screw blanks which do not fully enter said notches and to urge the same thereinto, and separate resilient means disposed in said notch and extending into the space between the bottom thereof and said first-mentioned resilient means to prevent the entry of the shanks of screw blanks into said space.

3. In a screw slotting machine, a movable carrier member having a plurality of notches in a face thereof adapted to receive the shanks of screw blanks, a pair of spaced track members extending perpendicularly to said face for feeding blanks into said notches; the end of one of said track members being spaced from said face a greater distance than the other, a retaining plate having a retaining surface adjacent said face adapted to engage the shanks of the blanks and retain them in said notches; the end portion of said retaining plate being disposed in the space between said track member and the carrier member and terminating substantially in alignment with the inner surface thereof to provide an extension of said track member and containing a notch which extends thereinto from the retaining surface, a plurality of spring members contained within said notch and having perpendicularly extending end portions terminating flush with said retaining surface, the innermost of said spring members being spaced from the bottom of the notch in the retaining plate to permit movement thereof and having the side of its end portion disposed in alignment with the end of the retaining plate to provide an extension of said track, a flat leaf spring contained within said notch and extending into the space between the innermost spring member and the bottom of the notch and terminating in alignment with the end of the retaining plate to prevent entry of said screw blanks into said space.

4. In a screw slotting machine, a movable carrier member having a plurality of notches in a face thereof of a size to receive the shank of a single screw blank, feed means including a guide opening for feeding screw blanks into said notches terminating in spaced relation to the notched face of the carrier member, a stationary retaining plate having a retaining and guiding surface spaced from and adjacent said face of the carrier member adapted to engage the shanks of said blanks and retain them in said notches; said retaining plate having a flat surface at its end portion extending substantially perpendicular to said face of the carrier member and forming a portion of one side of said guide opening and also having a notch in the corner of said end portion adjacent said face of the carrier member having a depth which will accommodate the length of the blank, and a plurality of L-shaped spring members secured in nested relation in said notch; said L-shaped spring members including finger portions extending substantially perpendicular to said face of the carrier member and having free end portions positioned to define an extension of said retaining and guiding surface; the side of the spring finger at the end of said retaining member being disposed in alignment with said flat surface and providing an extension of one side of the said guide opening; said spring members defining a freely movable corner portion on said retaining member at the entrance to the space between said retaining member and said carrier member disposed out of the normal travel path of said blanks, whereby said spring members normally serve as blank retainers and guides while being adapted to yield upon engagement by a blank which has not fully entered its notch and urge said blank thereinto.

References Cited in the file of this patent

UNITED STATES PATENTS

| | | |
|---|---|---|
| 1,675,510 | Nolan | July 3, 1928 |
| 2,104,944 | Friedman | Jan. 11, 1938 |
| 2,289,267 | Hansen et al. | July 7, 1942 |
| 2,337,181 | Burkey | Dec. 21, 1943 |
| 2,359,815 | Wilcox | Oct. 10, 1944 |
| 2,601,603 | Fisher | June 24, 1952 |
| 2,606,359 | Stadthaus | Aug. 12, 1952 |
| 2,643,404 | Fray | June 30, 1953 |